Figure 1:
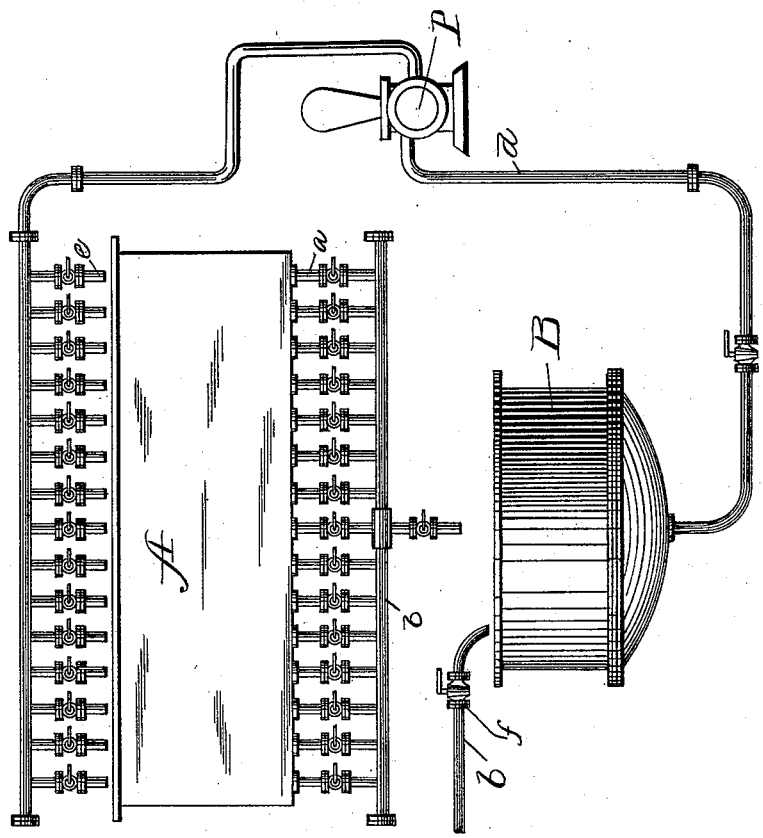

(No Model.) 4 Sheets—Sheet 1.
C. STEFFEN.
APPARATUS FOR LIXIVIATING SUGAR.

No. 449,976. Patented Apr. 7, 1891.

Witnesses
Walter P Keene.
James M. Spear.

Inventor:
Carl Steffen.
By Ulis Spear
Atty.

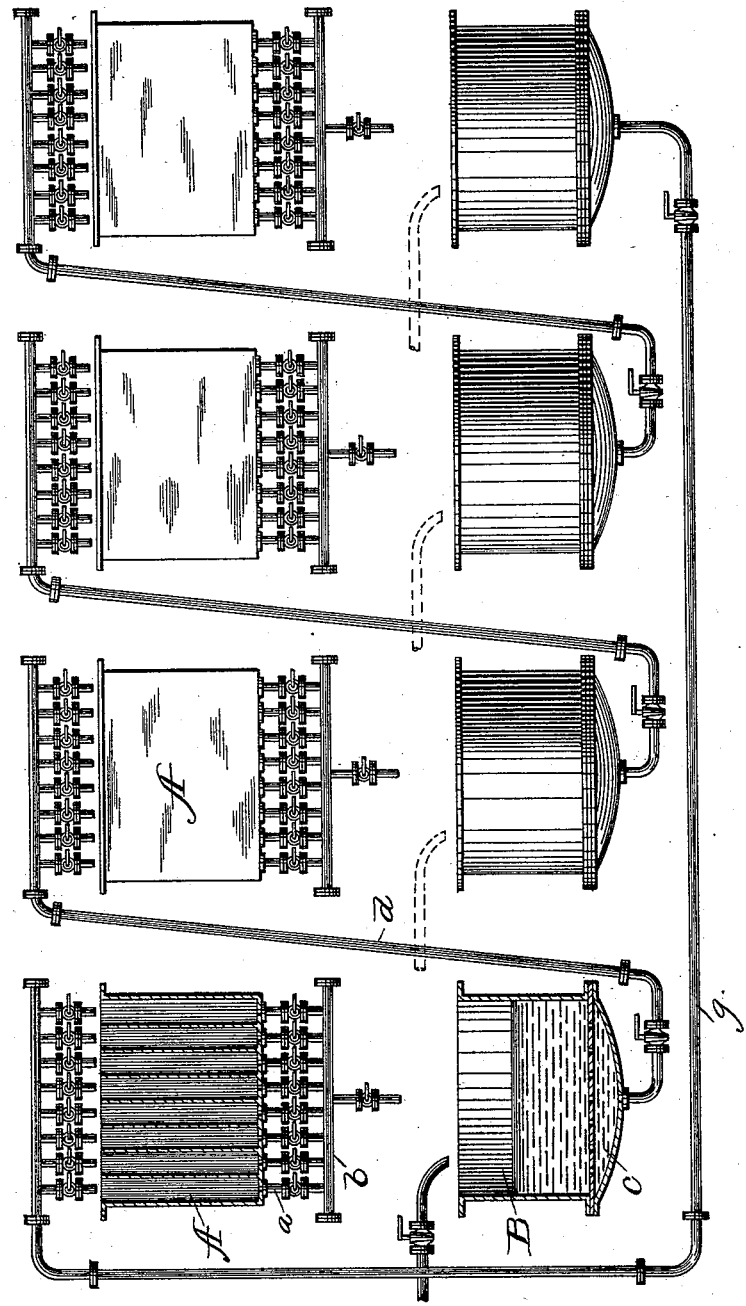

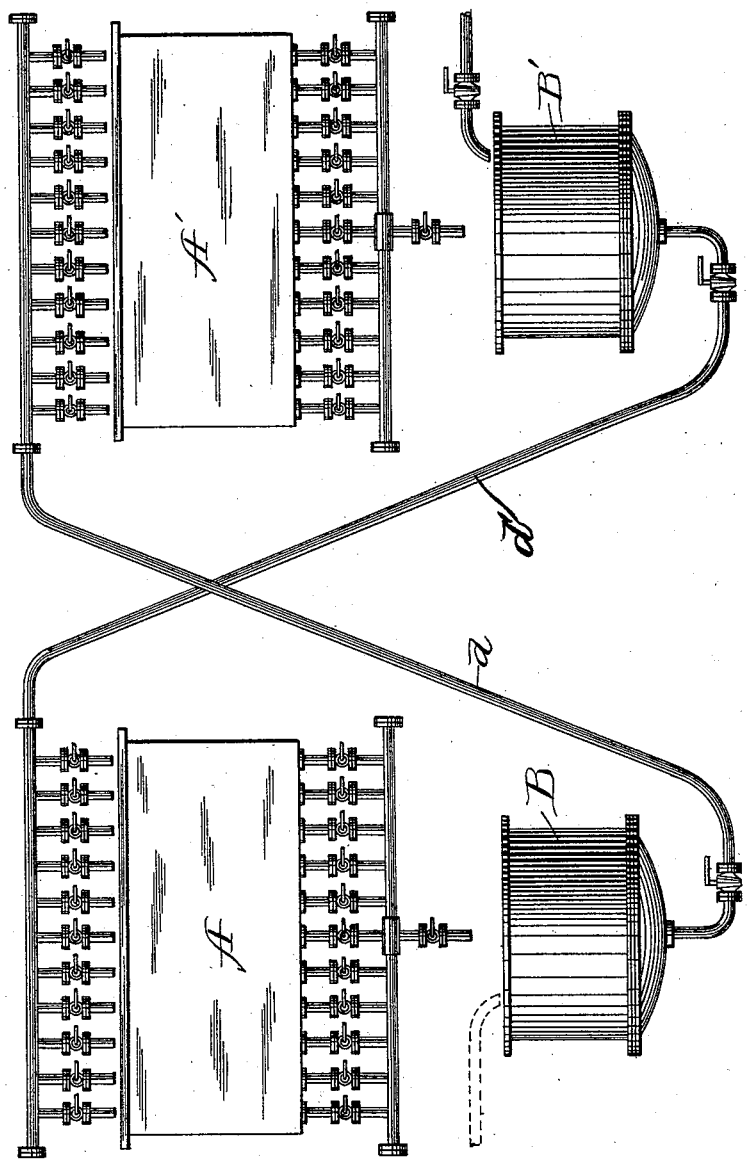

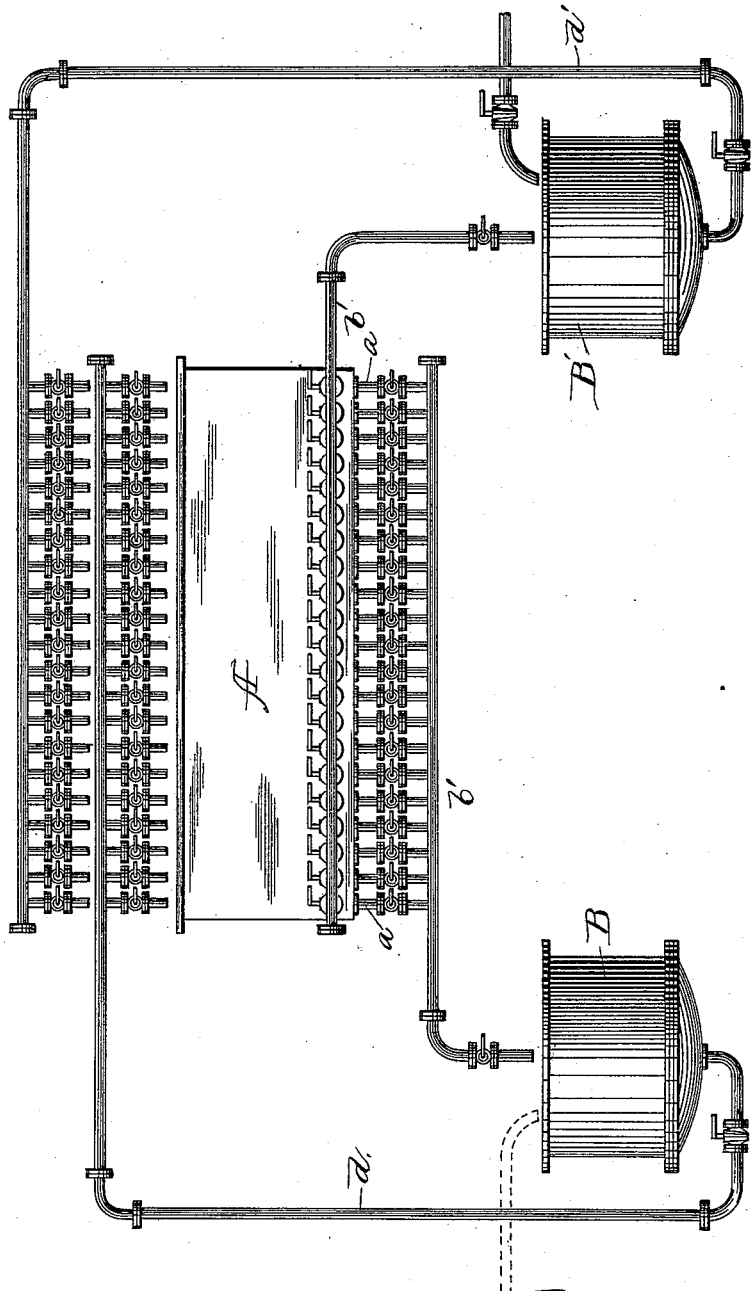

UNITED STATES PATENT OFFICE.

CARL STEFFEN, OF VIENNA, AUSTRIA-HUNGARY.

APPARATUS FOR LIXIVIATING SUGAR.

SPECIFICATION forming part of Letters Patent No. 449,976, dated April 7, 1891.

Application filed January 10, 1889. Serial No. 296,002. (No model.) Patented in Germany May 4, 1887, No. 43,484, and in England May 16, 1887, No. 7,119.

*To all whom it may concern:*

Be it known that I, CARL STEFFEN, of the city of Vienna, in the Austro-Hungarian Empire, have invented certain new and useful Improvements in Apparatus for Lixiviating Raw Sugar by the Use of Aqueous, Alcoholic, or other Saccharine Solutions, of which the following is a full, clear, and exact specification.

The subject-matter of this invention has been patented to me in Great Britain under date of May 16, 1887, No. 7,119, and in Germany under date May 4, 1887, No. 43,484.

It is the object of my invention to provide an apparatus by the use of which the sugar may be treated systematically to the action of lixiviating fluid in successive quantities of regularly-increasing purity and for grading the fluid for its action upon the next charge in like manner.

The invention therefore consists of a cellular chamber for containing the charges of lixiviating fluid graded according to purity, a lixiviating-vessel and the connections from the cellular vessel to the lixiviating-vessel, by means of which the contents of the lixiviating-vessel may be subjected to the action of the contents of the cellular vessel, and pipe connections from the lixiviating-vessel to the cellular vessel for drawing off the fluid after its action upon the material within the lixiviating-vessel, with connections to each cell by means of which each charge, after it has passed through the lixiviating-vessel, may be returned to its cell, and thus the liquid kept graded, increasing in purity for each successive charge.

It further consists in arranging a series of cellular vessels with a series of lixiviating-vessels with pipe connections from one cellular vessel to the lixiviating-vessel beneath it, and a pipe connection from the first lixiviating-vessel to the second cellular vessel of the series, and so on to the end of the series, and with a pipe connection from the last lixiviating-vessel of the series to the first cellular vessel, whereby each charge of sugar is subjected to the successive action of the graded solution. By means of this arrangement of cellular vessels I am enabled to separate the lixiviating-fluid in quantities differing according to the specific gravity of the fluid, and by subjecting a charge of sugar with the contents of each cell in succession I secure the same results as if the lixiviating-fluid would pass directly from one lixiviating-vessel to another and secure the advantage of providing a more compact apparatus and the treatment of the sugar in less time, as each mass is subjected to the contents of the entire number of cells and the graded fluid passes through the charge of sugar much more quickly than if taken directly from its action upon one charge of sugar and discharged into another charge.

In the drawings, Figure 1 represents an elevation of the apparatus comprising my invention, consisting of a vessel for containing the lixiviating-fluid and a lixiviating-vessel for the sugar to be treated, and the pipe connections. Fig. 2 represents a series of vessels for the lixiviating-fluid and a series of lixiviating-vessels with pipe connections. Figs. 3 and 4 represent the same vessels with modified connections.

In the drawings, the vessel for containing the lixiviating-fluid is shown at A, and it consists, as represented in the left-hand part of Fig. 2, of the vessel of cellular form, each cell being of a suitable size to contain a quantity of the lixiviating-fluid sufficient for action upon a charge of sugar. Each of these cells has a pipe connected with its bottom, and each of these pipes is provided with a stop-cock. These pipes are shown at *a*, and they connect with a horizontally-arranged pipe *b*, which in turn is provided with a downwardly-extending pipe having a stop-cock, and is directly above the lixiviating-vessel B, which contains the charge to be treated. It will thus be seen that the contents of each cell is under independent control, and may be discharged into the lixiviating-vessel when desired without disturbing the contents of the other cells.

The vessel B is a tank of suitable size, and is provided with a perforated bottom, through which the lixiviating-fluid passes to a chamber *c*, and from thence it can be drawn off through a suitable pipe *d*, which may, as in Fig. 1, pass up above the vessel A and be provided with short connecting-pipes *e*, each provided with a stop-cock, one being provided for each cell and extending downwardly in line with the upper part thereof. After the first cell has been discharged and has passed through the sugar it may be drawn off by a suitable pump through the pipe $d$, and the cock in the last pipe $e$ on the left opened and this fluid discharged into its cell. The contents of the next cell, which is preferably graded and is of greater purity than the first cell, is then discharged in like manner, and it is likewise drawn up and discharged into its cell, and thus not only can the contents of each cell be graded according to its purity in the beginning of the operation, but it may be kept graded, so that the lixiviating material may be discharged upon the sugar mass in successive quantities of gradually-increasing purity at all times.

At $f$ I have shown water-pipes for adding a quantity of water to the lixiviating-fluid during the lixiviating stage and before it is led onto a fresh charge of sugar.

In Fig. 2 I have shown a different arrangement of the vessels, having provided in this figure a series of cellular vessels A and a series of vessels B, with connection, as described for Fig. 1, from the vessel B; but instead of extending the pipe $d$ to the vessel from which the fluid has just been discharged I connect it with the cells of the next vessel A, and so on through the end of the series, the last vessel B having a connecting-pipe $g$ leading to the cells of the first vessel A.

In Fig. 3 I have shown two vessels A A′ and two vessels B B′, having the vessel B connected to the pipe $d$, so as to discharge the fluid into the vessel A′, and with a pipe $d'$ from the vessel B′ to the vessel A.

In Fig. 4 the cellular vessel is shown at A with two lixiviating-vessels B B′ and with a pipe $d$ leading from the vessel B above the cells to the vessel A, and with a pipe $d'$ leading from the vessel B′ above the cells of the vessel A, and with short pipes extending from the side of each cell and from the bottom, a horizontal pipe $b$ connecting the side pipes of the cells with the vessel B′, and a second horizontal pipe $b'$ connecting the pipes which extend from the bottom of the cells with the vessel B. In this case the contents of a portion of the cells may be discharged into the vessel B, and after passing through the vessel pass up through the pipe $d$ back to their cells, and may then be passed from their cells through the side pipes to the vessel B′. Thus the contents of the vessels B and B′ may be treated to the contents of the cells according to the requirements of the charge of sugar contained in the said vessels B and B′.

Any suitable means may be provided for raising the liquid from the lixiviating-vessel to the cellular vessel; but I have shown in the drawings a pump, as at P, for this purpose.

I claim as my invention—

1. In a lixiviating apparatus, a vessel for the sugar to be treated, a vessel containing the lixiviating-fluid provided with a series of cells, a pipe leading from each cell, and a pipe, as $b$, in connection with the pipes of the cells, and an outlet from said pipe $b$ to the lixiviating-vessel, substantially as described.

2. In combination, a series of cellular vessels A, a series of lixiviating-vessels B, pipe connections from the cell of each vessel A to its vessel B, and pipe connections from the vessels B to the cellular vessels, and with a connecting-pipe to each cell, substantially as described.

3. In a lixiviating apparatus, a vessel for the sugar to be treated, a vessel containing the lixiviating-fluid, provided with a series of cells, a pipe leading from each cell, and a pipe, as $b$, in connection with the pipes of the cells and leading directly to the lixiviating-vessel, substantially as described.

In witness whereof I have hereunto signed my name in the presence of two subscribing witnesses.

CARL STEFFEN.

Witnesses:
ANTHONY STEFFEN,
FRED J. DOWNING.